US008868065B2

(12) United States Patent
Chang et al.

(10) Patent No.: US 8,868,065 B2
(45) Date of Patent: Oct. 21, 2014

(54) SYSTEM AND METHOD FOR REDUCING POWER CONSUMPTION FOR PUSH MESSAGING

(75) Inventors: Ray L. Chang, Sunnyvale, CA (US); Justin Mcleod North Wood, Sunnyvale, CA (US); Steven D. Parker, San Francisco, CA (US); Daniel B. Pollack, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 13/492,675

(22) Filed: Jun. 8, 2012

(65) Prior Publication Data

US 2013/0331091 A1 Dec. 12, 2013

(51) Int. Cl.
*H04W 52/02* (2009.01)
(52) U.S. Cl.
CPC ..................................... *H04W 52/02* (2013.01)
USPC ........................................ 455/423; 455/426.1
(58) Field of Classification Search
USPC ........................................ 455/423, 522, 41.2
See application file for complete search history.

(56) References Cited

U.S. PATENT DOCUMENTS

| 2009/0170557 | A1* | 7/2009 | Chauhan et al. | 455/552.1 |
| 2010/0216435 | A1* | 8/2010 | Martin et al. | 455/414.1 |
| 2012/0196644 | A1* | 8/2012 | Scherzer et al. | 455/524 |
| 2012/0230191 | A1* | 9/2012 | Fang | 370/235 |
| 2012/0315905 | A1* | 12/2012 | Zhu et al. | 455/436 |

* cited by examiner

*Primary Examiner* — Kashif Siddiqui
(74) *Attorney, Agent, or Firm* — Blakely, Sokoloff, Taylor & Zafman LLP (57) ABSTRACT

A method, apparatus and machine readable medium are described for reducing power consumption for push messaging. For example, a method in accordance with one embodiment comprises the operations of: registering with a push notification service over a first communication interface, the push notification service to push notifications to the wireless client in response to detected events; detecting that a usable connection to the push notification service may be established over a second communication interface, the second communication interface being an interface which will be operative for reasons other than a connection to the push notification service; responsively disconnecting from the push notification service over the first communication interface and reconnecting over the second communication interface; and temporarily powering down the first communication interface.

30 Claims, 9 Drawing Sheets

SYSTEM AND METHOD FOR REDUCING POWER CONSUMPTION FOR PUSH MESSAGING

BACKGROUND

1. Field of the Invention

This invention relates generally to the field of data processing systems. More particularly, the invention relates to an improved apparatus and method for reducing power consumption for push messaging.

2. Description of Related Art

Current wireless data processing devices such as the iPhone and iPad (designed and sold by the assignee of the present patent application) are capable of registering with a push notification service to receive push messages. Push messages are transmitted over a wireless network such as a Wifi or cellular data network to provide notifications to the end user. For example, when the user receives a new email message, the push notification service will push a notification to the wireless data processing device informing the end user of the new email message. Various other types of applications may utilize the push notification service to provide push notifications to the end user including phone service notifications, application store notifications, instant message notifications, and calendar notifications, to name just a few.

Figure 1:
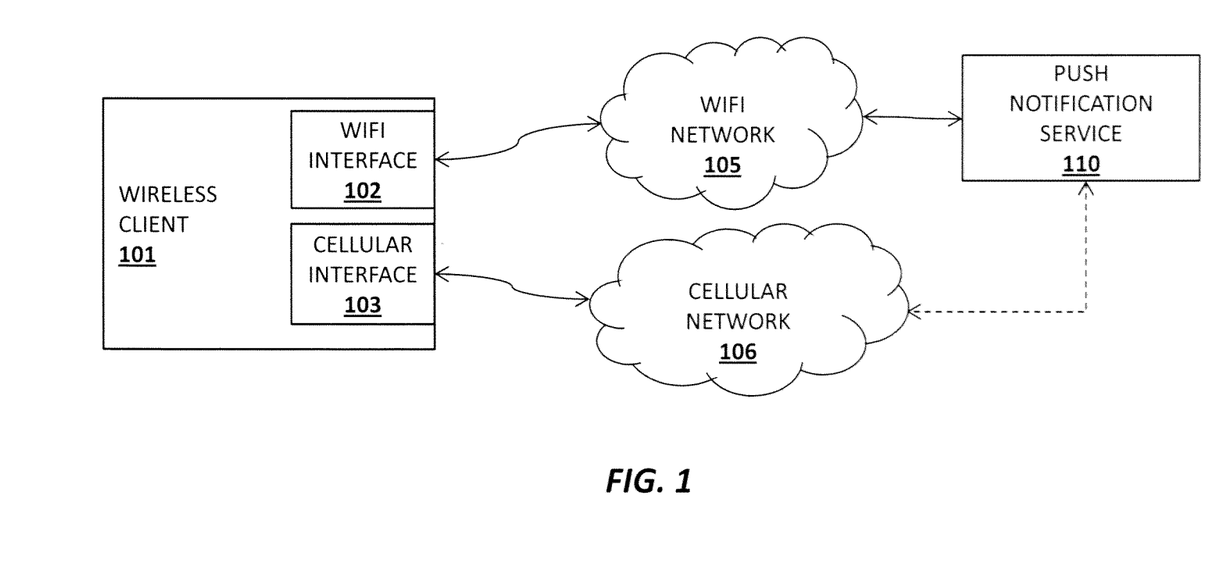
FIG. 1 illustrates a prior art wireless client connecting to a push notification service over a Wifi network and a cellular network.

As mentioned, wireless data processing devices are capable of connecting to the push notification service through multiple different communication interfaces including Wifi interfaces (e.g., 802.11 interfaces) and cellular data interfaces (e.g., GPRS, G3, G4 interfaces). FIG. 1, for example, illustrates a wireless client 101 with a Wifi interface 102 for connecting to the push notification service 110 over a Wifi network 105 and a cellular interface 103 for connecting to the push notification service 110 over the cellular network 106. Thus, in some circumstances, the wireless client 201 may be connected to the push service 210 over the Wifi network 105 even when a reliable cellular connection exists, thereby consuming power using both the Wifi interface and the cellular interface. It would be beneficial in these circumstances to select one of the two interfaces over which to receive push notifications so that the other interface may be temporarily powered down to conserve power.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below are embodiments of an apparatus, method, and machine-readable medium for intelligently selecting to receive push notifications over a particular wireless interface to conserve power. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

Figure 2:
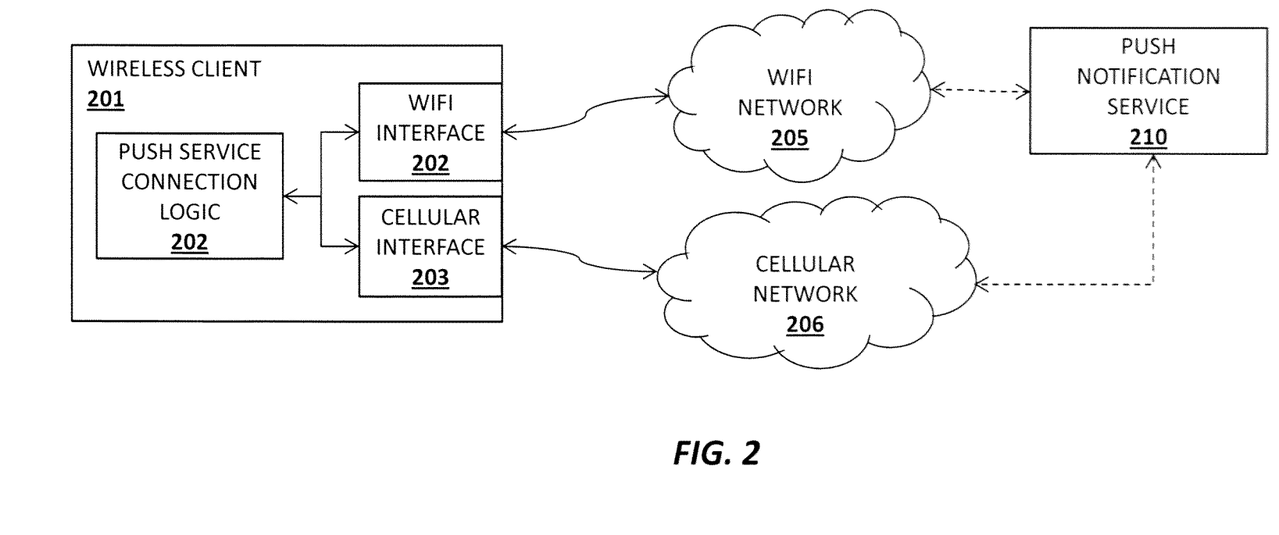
FIG. 2 illustrates one embodiment of a wireless client for intelligently selecting to receive push notifications over either a Wifi network or a cellular network.

In one embodiment, illustrated in FIG. 2, a wireless client 201 includes push notification service connection logic 202 for implementing the techniques described herein to select between a Wifi interface 202 and a cellular interface 203 for receiving push notifications from a push notification service 210. In one embodiment, if the wireless client 201 is currently connected to the push notification service 210 over the Wifi network 205 (via the Wifi interface 202), and detects that a reliable connection exists over the cellular network 206 (via the cellular interface 203), it will break the connection over the Wifi network 205 and reconnect to the push service 210 over the cellular network 206. One reason for connecting over the cellular network in these circumstances is that the cellular connection needs to remain open regardless of how the wireless client 201 connects to the push service 210 (i.e., so that the wireless client 201 can receiving incoming phone calls over the cellular network). Thus, connecting to the push notification service 210 via the cellular network 206 allows the Wifi interface 202 to be temporarily powered down, thereby conserving power.

Figure 3:
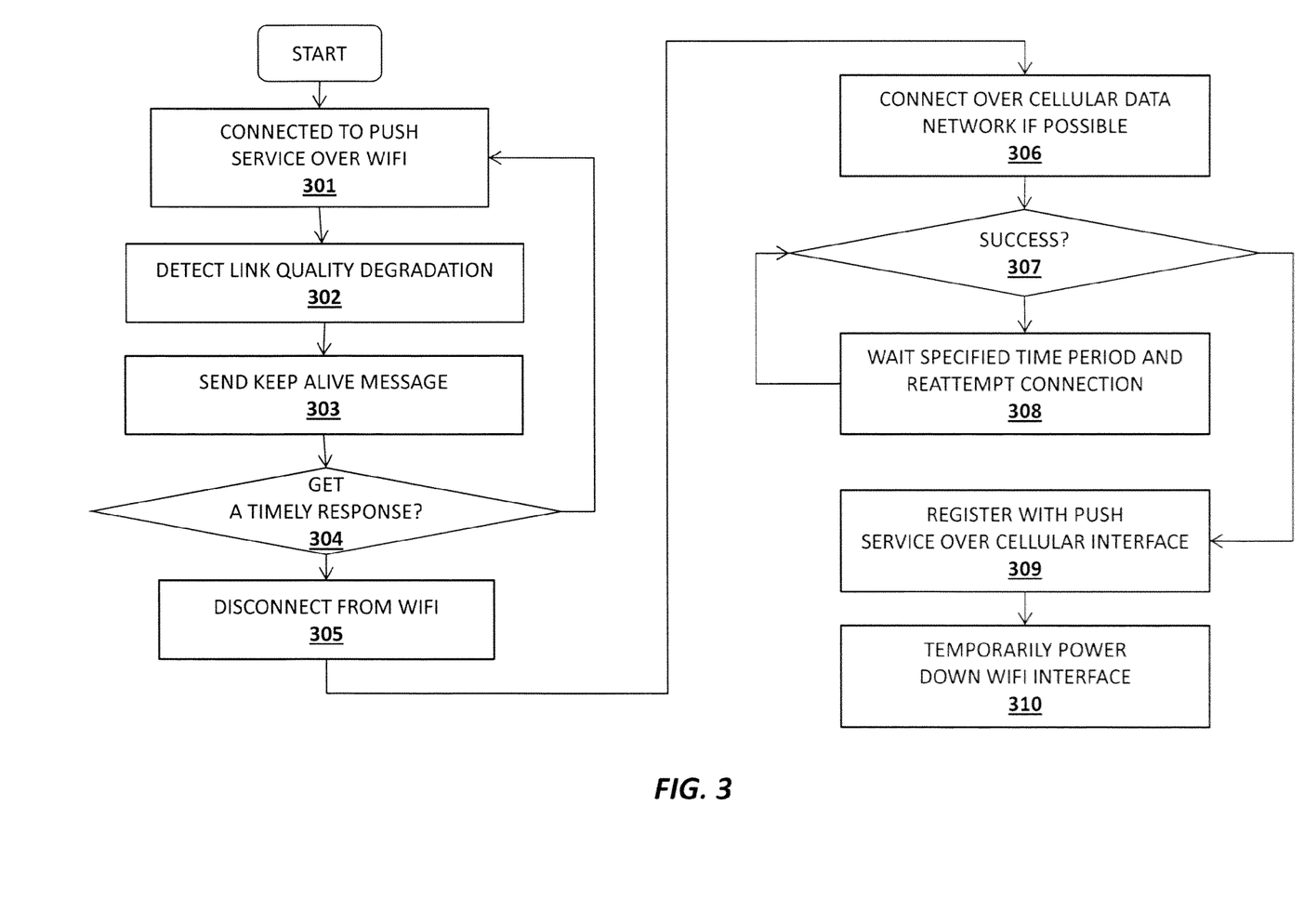
FIG. 3 illustrates one embodiment of a method for intelligently selecting to receive push notifications over either a Wifi network or a cellular network.

One embodiment of a method implemented by the push service connection logic 202 to switch between Wifi and cellular interfaces is illustrated in FIG. 3. At 301, the wireless client is initially connected to the push notification service over the Wifi network. At 302 a degradation of link quality of the Wifi connection is detected. In one embodiment, the "quality" of the Wifi connection is measured with a numeric value (e.g., from 0 to 7) and threshold values may be set to establish "poor" link quality (e.g., a value of 3 or below). In one embodiment, the link quality thresholds are programmable and may be set on the wireless client dynamically by a remote configuration service (not shown). In this way, the link quality thresholds may be periodically tweaked to improve performance.

Regardless of the specific thresholds used and the manner in which the thresholds are set, if a "poor" link quality is detected, then, in one embodiment, the wireless client will automatically transmit a keep-alive message to the push notification service at 303. In one embodiment, the wireless client is configured to automatically send keep-alive messages in response to a detected degradation in link quality below the specified threshold.

If a timely response is received, determined at 304, then the wireless client will remain connected to the push notification service over the Wifi interface at 301. In one embodiment, a timely response is one which is received within a designated time period.

If a timely response is not received, then at 305, the push service connection logic 202 disconnects from the push notification service and, at 306, connects to the push notification service over the cellular interface. If the connection is initially unsuccessful, determined at 307, then it will wait a specified time period and re-attempt to connect. If successful, then the push service connection logic will register to receive push notifications from the push notification service over the cellular interface. The Wifi interface may then be temporarily powered down to conserve power at 310.

In an alternate implementation, the wireless client may bypass the keep-alive message at 303 and automatically disconnect from Wifi at 305 and attempt to connect over the cellular data network at 306 as soon as a poor link quality is detected. Additionally, in one embodiment, if the connection over the cellular interface is unsuccessful at 307, then the wireless client may re-attempt to connect over Wifi and return to 301 (rather than waiting a period of time and attempting to connect over the cellular network at 308).

Figure 4:
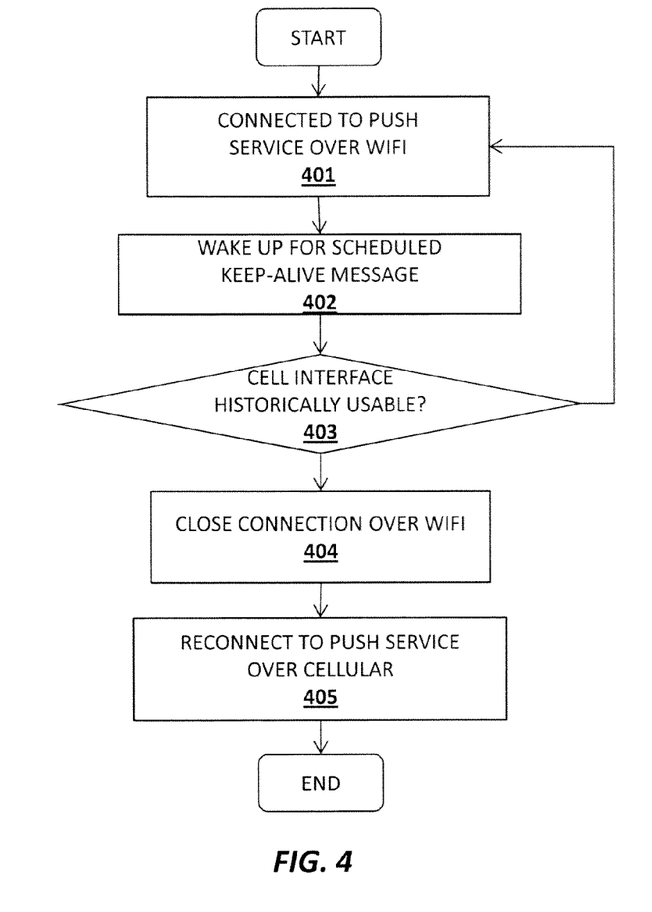
FIG. 4 illustrates another embodiment of a method for intelligently selecting to receive push notifications over either a Wifi network or a cellular network.

FIG. 4 illustrates another embodiment in which the wireless client switches from the Wifi interface to the cellular interface in response to detecting that the cell interface has been historically usable. Specifically, at 401, the wireless client is initially connected to the push service over a Wifi connection. At 402, the Wifi interface wakes up to transmit a periodic keep-alive message to the push service. The transmission of periodic keep-alive messages ensures that the connection to the push notification service will remain open (if no data traffic is detected over a TCP socket for a period of time the TCP socket may automatically be closed by the wireless device and/or data service).

When it is time to transmit the keep-alive message, a determination is made as to whether the cell interface is "historically usable" at 403. In one embodiment, the number of "off" transitions is recorded for the cellular network over a designated window of time (e.g., 1 hour). If the number of "off" transitions is below a specified threshold, then the cell interface is designated "historically usable" (indicating that there is likely to be a reliable cellular connection). By contrast, if the number of "off" transitions is above (or equal to) the specified threshold, then the cell interface is designated to be "historically unusable."

If the cell interface is historically usable, then at 404, the Wifi connection is closed (severing the connection to the push notification service) and, at 405, the client device connects to the push notification service via the cellular network. Once again, once the connection is made over the cellular network, the Wifi interface may be temporarily powered down to conserve power.

It should be noted that both of the embodiments illustrated in FIGS. 3 and 4 may be implemented concurrently on a wireless client. For example, the embodiment from FIG. 3 may be implemented in response to a detected deterioration in link quality while the embodiment from FIG. 4 may be implemented periodically (in response to the specified timing for a new keep-alive message). Regardless of which technique is employed, the end result is that a connection with the push notification service may be established over the cellular interface to conserve power.

Figure 5:
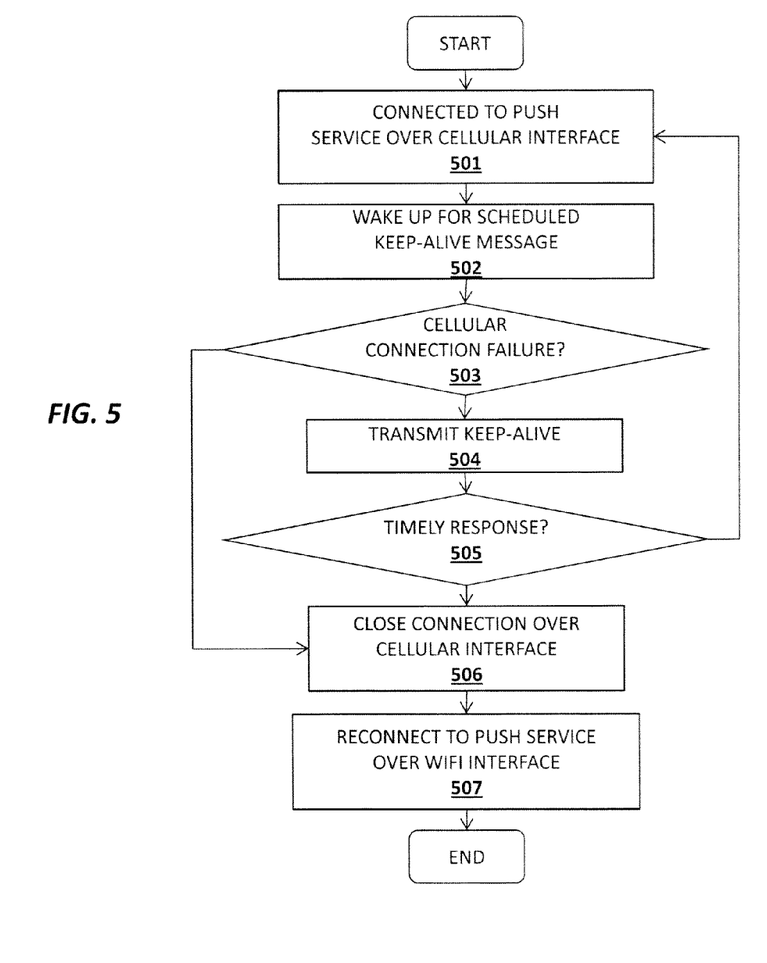
FIG. 5 illustrates another embodiment of a method for intelligently selecting to receive push notifications over either a Wifi network or a cellular network.

FIG. 5 illustrates one embodiment in which the wireless clients switches from a connection over the cellular interface to the Wifi interface in response to a detected degradation in the cellular interface. At 501, the wireless client is connected to the push notification service via the cellular interface. At 502 the cellular interface wakes up to transmit a periodic keep-alive message (as mentioned, to ensure that the TCP connection remains open the wireless client is configured to transmit periodic keep-alive messages). If a failure of the cellular connection is detected, determined at 503, then, at 506, the connection over the cellular interface is closed and, at 507, the wireless client reconnects to the push notification service over the Wifi interface. Depending on the circumstances, the cellular interface may be temporarily powered down to conserve power.

If the cellular connection has not failed at 503, then at 504, a keep-alive message is transmitted and, at 505, a determination is made as to whether a timely response has been received to the keep-alive message. If a timely response is received then the process returns to 501 and the wireless client remains connected to the push notification service over the cellular network. If a timely response is not received then the cellular connection is closed at 506 and, at 507, the wireless client reconnects to the push notification service over the Wifi interface.

While the embodiments of the invention are described above within the context of two specific communication channels, Wifi and cellular, the underlying principles of the invention are not limited to any particular type of communication channel. For example, the underlying principles of the invention may be employed on any client device with multiple communication interfaces capable of connecting over multiple different types of communication channels. For example, the principles of the invention may be implemented to connect to a push notification service over a first communication interface so that a second communication interface may be temporarily powered down to reduce power consumption.

Different API Embodiments

Different embodiments described herein include an application programming interface (API) implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component 2010 and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 6:
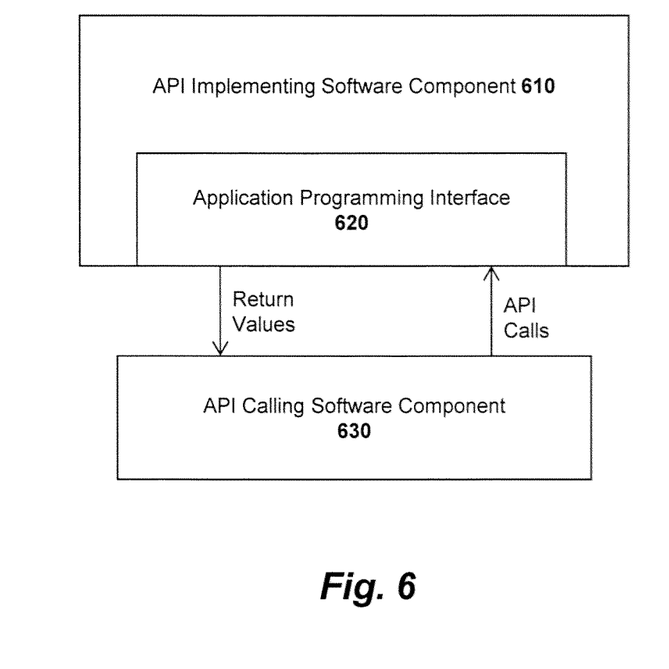
FIG. 6 illustrates an application programming interface employed in one embodiment of the invention.

FIG. 6 illustrates one embodiment of an API architecture which includes an API implementing software component 610 (e.g., an operating system, a library, a device driver, an API, an application program, or other software module) that implements the API 620. The API 620 specifies one or more functions, methods, classes, objects, protocols, data structures, formats and/or other features of the API implementing software component that may be used by the API calling software component 630. The API 620 can specify at least one calling convention that specifies how a function in the API implementing software component receives parameters from the API calling software component and how the function returns a result to the API calling software component. The API calling software component 630 (e.g., an operating system, a library, a device driver, an API, an application program, or other software module), makes API calls through the API 620 to access and use the features of the API implementing software component 610 that are specified by the API 620. The API implementing software component 610 may return a value through the API 620 to the API calling software component 630 in response to an API call.

It will be appreciated that the API implementing software component 610 may include additional functions, methods, classes, data structures, and/or other features that are not specified through the API 620 and are not available to the API calling software component 630. It should be understood that the API calling software component 630 may be on the same system as the API implementing software component 610 or may be located remotely and accesses the API implementing software component 610 using the API 620 over a network. While FIG. 6 illustrates a single API calling software component 630 interacting with the API 620, it should be understood that other API calling software components, which may be written in different languages (or the same language) than the API calling software component 630, may use the API 620.

The API implementing software component 610, the API 620, and the API calling software component 630 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 7:
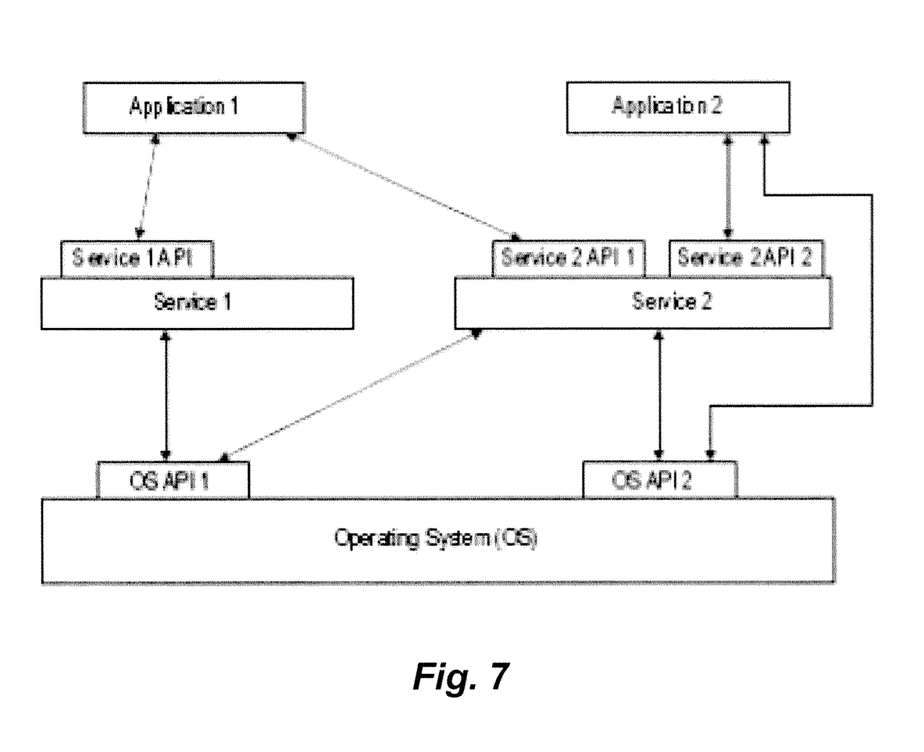
FIG. 7 illustrates exemplary applications interfacing to services and operating systems in accordance with one embodiment of the invention.

In FIG. 7 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Data Processing Devices

Figure 8:
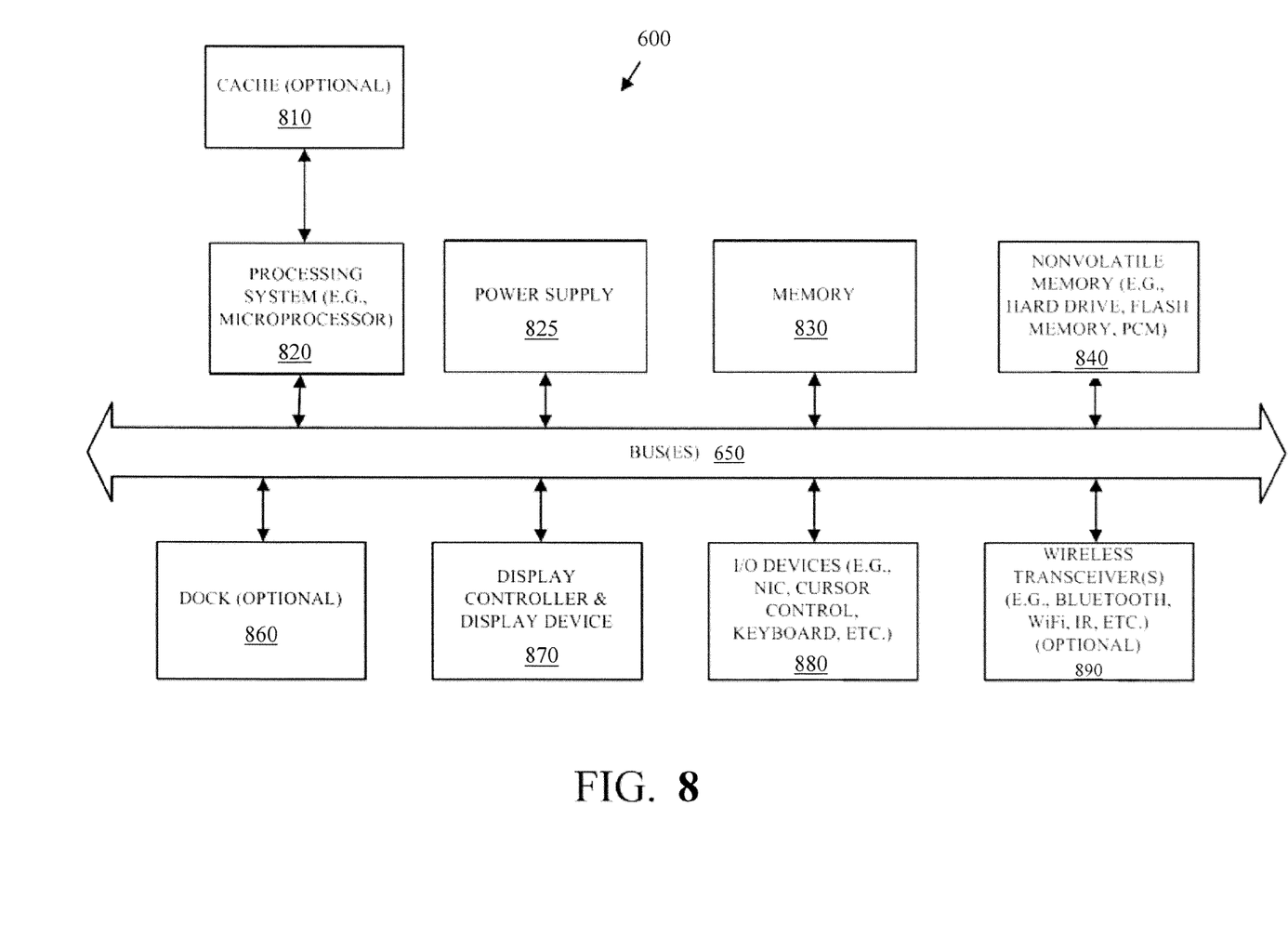
FIG. 8 illustrates an architecture of a data processing device on which embodiments of the invention may be implemented.

FIG. 8 is a block diagram illustrating an exemplary computer system which may be used in some embodiments of the invention. It should be understood that while FIG. 8 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 8, the computer system 800, which is a form of a data processing system, includes the bus(es) 850 which is coupled with the processing system 820, power supply 825, memory 830, and the nonvolatile memory 840 (e.g., a hard drive, flash memory, Phase-Change Memory (PCM), etc.). The bus(es) 850 may be connected to each other through various bridges, controllers, and/or adapters as is well known in the art. The processing system 820 may retrieve instruction(s) from the memory 830 and/or the nonvolatile memory 840, and execute the instructions to perform operations as described above. The bus 850 interconnects the above components together and also interconnects those components to the optional dock 860, the display controller & display device 870, Input/Output devices 880 (e.g., NIC (Network Interface Card), a cursor control (e.g., mouse, touchscreen, touchpad, etc.), a keyboard, etc.), and the optional wireless transceiver(s) 890 (e.g., Bluetooth, WiFi, Infrared, etc.).

Figure 9:
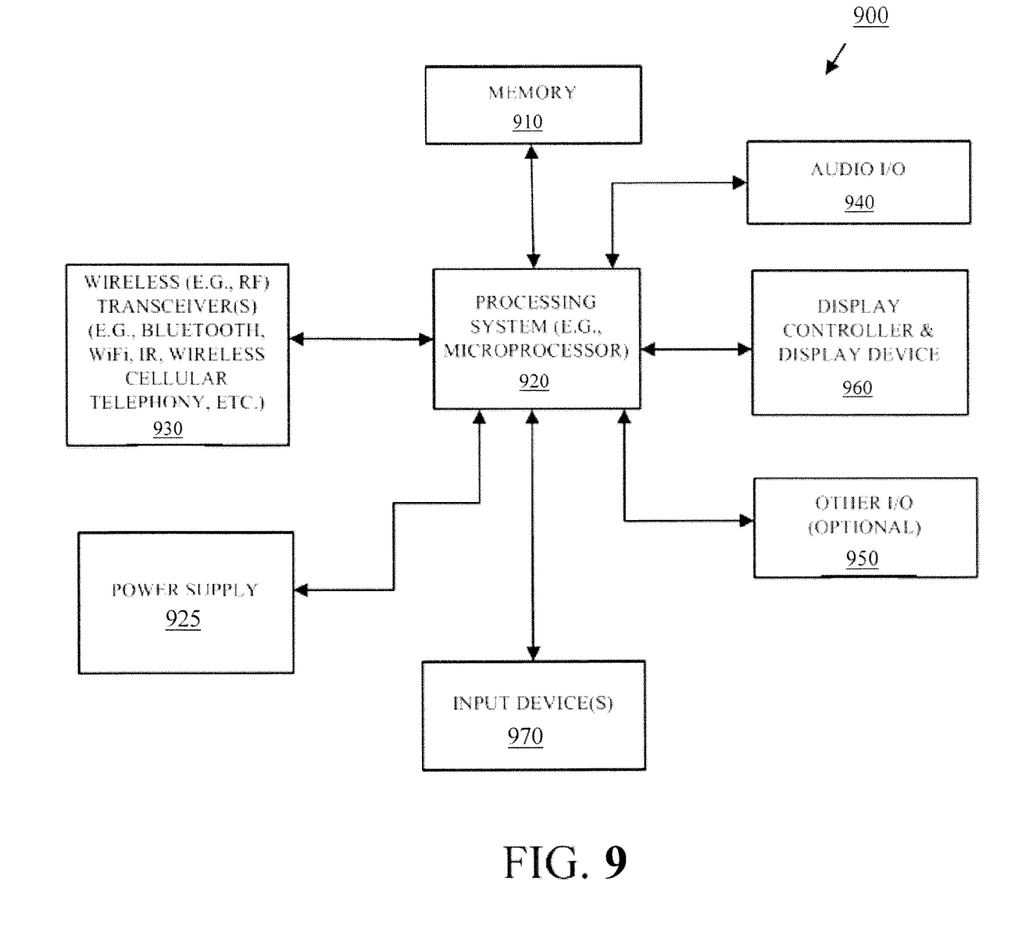
FIG. 9 illustrates another architecture of a data processing device on which embodiments of the invention may be implemented.

FIG. 9 is a block diagram illustrating an exemplary data processing system which may be used in some embodiments of the invention. For example, the data processing system 900 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 900 may be a network computer or an embedded processing device within another device.

According to one embodiment of the invention, the exemplary architecture of the data processing system 900 may used for the mobile devices described above. The data processing system 900 includes the processing system 920, which may include one or more microprocessors and/or a system on an integrated circuit. The processing system 920 is coupled with a memory 910, a power supply 925 (which includes one or more batteries) an audio input/output 940, a display controller and display device 960, optional input/output 950, input device(s) 970, and wireless transceiver(s) 930. It will be appreciated that additional components, not shown in FIG. 9, may also be a part of the data processing system 900 in certain embodiments of the invention, and in certain embodiments of the invention fewer components than shown in FIG. 9 may be used. In addition, it will be appreciated that one or more buses, not shown in FIG. 9, may be used to interconnect the various components as is well known in the art.

The memory 910 may store data and/or programs for execution by the data processing system 900. The audio input/output 940 may include a microphone and/or a speaker to, for example, play music and/or provide telephony functionality through the speaker and microphone. The display controller and display device 960 may include a graphical user interface (GUI). The wireless (e.g., RF) transceivers 930 (e.g., a WiFi transceiver, an infrared transceiver, a Bluetooth transceiver, a wireless cellular telephony transceiver, etc.) may be used to communicate with other data processing systems. The one or more input devices 970 allow a user to provide input to the system. These input devices may be a keypad, keyboard, touch panel, multi touch panel, etc. The optional other input/output 950 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A method implemented on a wireless client comprising:
   registering, by the wireless client, the wireless client with a push notification service over a first communication interface, the push notification service to push notifications of events to the wireless client in response to detecting the events;
   detecting, by the wireless client, that a reliable connection exists over a second communication interface, the second communication interface being an interface through which the wireless client is connected to a service other than the push notification service simultaneously with the first communication interface being connected to the push notification service;
   responsively disconnecting, by the wireless client, the wireless client from the push notification service over the first communication interface and re-connecting the wireless client to the push notification service over the second communication interface; and
   temporarily powering down, by the wireless client, the first communication interface.

2. The method as in claim 1 wherein the first communication interface comprises a Wifi interface and the second communication interface comprises a cellular interface.

3. The method as in claim 1 further comprising:
   determining, by the wireless client, reliability of the connection over the second communication interface; and
   connecting over the second communication interface and disconnecting from the first communication interface only if the reliability of the second communication interface is above a specified reliability threshold.

4. The method as in claim 3 further comprising:
   maintaining a connection history for the second communication interface over a designated window of time; and
   using the connection history to determine whether a usable connection to the push notification service exists over the second interface.

5. The method as in claim 4 wherein the connection history comprises a number of "off" transitions over the second communication interface during the designated window of time.

6. The method as in claim 1 further comprising:
   detecting that the second communication interface has become unreliable or inoperative; and
   responsively disconnecting from the push notification service over the second communication interface and re-connecting over the first communication interface.

7. The method as in claim 1 further comprising:
   periodically transmitting keep-alive messages over the first communication interface or the second communication interface to maintain an open connection with the push notification service.

8. The method as in claim 7 wherein the open connection is maintained if a keep-alive response is received in a timely manner.

9. The method as in claim 1 further comprising:
   detecting a degradation in link quality for the first communication interface: and
   responsively disconnecting from the push notification service over the first communication interface and re-connecting over the second communication interface only when the link quality for the first communication interface is below a specified link quality threshold.

10. The method as in claim 9 further comprising:
  transmitting a keep-alive message over the first communication interface in response to detecting the degradation in link quality; and
  connecting to the push notification service over the second communication interface only if a timely response to the keep-alive message is not received over the first communication interface.

11. A non-transitory machine-readable medium having program code stored thereon which, when executed by a machine, causes the machine to perform the operations of:
  registering, by a wireless client, the wireless client with a push notification service over a first communication interface, the push notification service to push notifications of events to the wireless client in response to detecting the events;
  detecting, by the wireless client, that a reliable connection exists over a second communication interface, the second communication interface being an interface through which the wireless client is connected to a service other than the push notification service simultaneously with the first communication interface being connected to the push notification service;
  responsively disconnecting, by the wireless client, the wireless client from the push notification service over the first communication interface and re-connecting the wireless client to the push notification service over the second communication interface; and
  temporarily powering down the first communication interface.

12. The non-transitory machine-readable medium as in claim 11 wherein the first communication interface comprises a Wifi interface and the second communication interface comprises a cellular interface.

13. The non-transitory machine-readable medium as in claim 11 comprising additional program code to cause the operations of:
  determining, by the wireless client, reliability of the connection over the second communication interface; and
  connecting over the second communication interface and disconnecting from the first communication interface only if the reliability of the second communication interface is above a specified reliability threshold.

14. The non-transitory machine-readable medium as in claim 13 comprising additional program code to cause the operations of:
  maintaining a connection history for the second communication interface over a designated window of time; and
  using the connection history to determine whether a usable connection to the push notification service exists over the second interface.

15. The non-transitory machine-readable medium as in claim 14 wherein the connection history comprises a number of "off" transitions over the second communication interface during the designated window of time.

16. The non-transitory machine-readable medium as in claim 11 comprising additional program code to cause the operations of:
  detecting that the second communication interface has become unreliable or inoperative; and
  responsively disconnecting from the push notification service over the second communication interface and re-connecting over the first communication interface.

17. The non-transitory machine-readable medium as in claim 11 comprising additional program code to cause the operations of:
  periodically transmitting keep-alive messages over the first communication interface or the second communication interface to maintain an open connection with the push notification service.

18. The non-transitory machine-readable medium as in claim 17 wherein the open connection is maintained if a keep-alive response is received in a timely manner.

19. The non-transitory machine-readable medium as in claim 11 comprising additional program code to cause the operations of:
  detecting a degradation in link quality for the first communication interface; and
  responsively disconnecting from the push notification service over the first communication interface and re-connecting over the second communication interface only when the link quality for the first communication interface is below a specified link quality threshold.

20. The non-transitory machine-readable medium as in claim 19 comprising additional program code to cause the operations of:
  transmitting a keep-alive message over the first communication interface in response to detecting the degradation in link quality; and
  connecting to the push notification service over the second communication interface only if a timely response to the keep-alive message is not received over the first communication interface.

21. An apparatus comprising a memory for storing program code and a processor for processing the program code to perform the operations of:
  registering, by a wireless client, the wireless client with a push notification service over a first communication interface, the push notification service to push notifications of events to the wireless client in response to detecting the events;
  detecting, by the wireless client, that a reliable connection exists over a second communication interface, the second communication interface being an interface through which the wireless client is connected to a service other than the push notification service simultaneously with the first communication interface being connected to the push notification service;
  responsively disconnecting, by the wireless client, the wireless client from the push notification service over the first communication interface and re-connecting over the second communication interface; and
  temporarily powering down, by the wireless client, the first communication interface.

22. The apparatus as in claim 21 wherein the first communication interface comprises a Wifi interface and the second communication interface comprises a cellular interface.

23. The apparatus as in claim 21 further comprising program code to cause the processor to perform the operations of:
  determining, by the wireless client, reliability of the connection over the second communication interface; and
  connecting over the second communication interface and disconnecting from the first communication interface only if the reliability of the second communication interface is above a specified reliability threshold.

24. The apparatus as in claim 23 further comprising program code to cause the processor to perform the operations of:
  maintaining a connection history for the second communication interface over a designated window of time; and
  using the connection history to determine whether a usable connection to the push notification service exists over the second interface.

25. The apparatus as in claim 24 wherein the connection history comprises a number of "off" transitions over the second communication interface during the designated window of time.

26. The apparatus as in claim 21 further comprising program code to cause the processor to perform the operations of:
   detecting that the second communication interface has become unreliable or inoperative; and
   responsively disconnecting from the push notification service over the second communication interface and re-connecting over the first communication interface.

27. The apparatus as in claim 21 further comprising program code to cause the processor to perform the operations of:
   periodically transmitting keep-alive messages over the first communication interface or the second communication interface to maintain an open connection with the push notification service.

28. The apparatus as in claim 27 wherein the open connection is maintained if a keep-alive response is received in a timely manner.

29. The apparatus as in claim 21 further comprising program code to cause the processor to perform the operations of:
   detecting a degradation in link quality for the first communication interface; and
   responsively disconnecting from the push notification service over the first communication interface and re-connecting over the second communication interface only when the link quality for the first communication interface is below a specified link quality threshold.

30. The apparatus as in claim 29 further comprising program code to cause the processor to perform the operations of:
   transmitting a keep-alive message over the first communication interface in response to detecting the degradation in link quality; and
   connecting to the push notification service over the second communication interface only if a timely response to the keep-alive message is not received over the first communication interface.

* * * * *